United States Patent
Chiang et al.

(10) Patent No.: US 9,409,147 B2
(45) Date of Patent: Aug. 9, 2016

(54) METHOD FOR GRANULATION OF ABSORBENT AND ADSORBENT GRANULES PREPARED BY THE SAME

(71) Applicant: Institute of Nuclear Energy Research Atomic Energy Council, Executive Yuan, Longtan Township, Taoyuan County (TW)

(72) Inventors: Sheng-Wei Chiang, Longtan Township, Taoyuan County (TW); Kuang-Li Chien, Longtan Township, Taoyuan County (TW); Jen-Chieh Chung, Longtan Township, Taoyuan County (TW); Shih-Che Huang, Longtan Township, Taoyuan County (TW); Chi-Hung Liao, Longtan Township, Taoyuan County (TW); Kou-Min Lin, Longtan Township, Taoyuan County (TW)

(73) Assignee: INSTITUTE OF NUCLEAR ENERGY RESEARCH ATOMIC ENERGY COUNCIL, EXECUTIVE YUAN, Taoyuan County (TW)

( * ) Notice: Subject to any disclaimer, the term of this patent is extended or adjusted under 35 U.S.C. 154(b) by 210 days.

(21) Appl. No.: 14/454,448

(22) Filed: Aug. 7, 2014

(65) Prior Publication Data

US 2015/0238932 A1    Aug. 27, 2015

(30) Foreign Application Priority Data

Feb. 25, 2014   (TW) .............................. 103106269 A

(51) Int. Cl.
| | | |
|---|---|---|
| B01J 23/00 | (2006.01) | |
| B01J 20/30 | (2006.01) | |
| B01J 47/00 | (2006.01) | |
| B01J 20/18 | (2006.01) | |
| C02F 1/42 | (2006.01) | |
| B01J 20/10 | (2006.01) | |
| B01J 20/12 | (2006.01) | |
| B01J 20/16 | (2006.01) | |
| G21F 9/12 | (2006.01) | |
| G21F 9/04 | (2006.01) | |
| G21F 9/10 | (2006.01) | |
| C02F 101/00 | (2006.01) | |

(52) U.S. Cl.
CPC .............. *B01J 20/3021* (2013.01); *B01J 20/10* (2013.01); *B01J 20/12* (2013.01); *B01J 20/165* (2013.01); *B01J 20/18* (2013.01); *B01J 20/183* (2013.01); *B01J 20/3028* (2013.01); *B01J 47/007* (2013.01); *C02F 1/42* (2013.01); *G21F 9/04* (2013.01); *G21F 9/10* (2013.01); *G21F 9/12* (2013.01); *C02F 2101/006* (2013.01)

(58) Field of Classification Search
CPC ....................................................... B01J 23/00
USPC ....................................................... 502/325
See application file for complete search history.

(56) References Cited

U.S. PATENT DOCUMENTS 8,394,739 B2 *   3/2013   Al-Jlil ..................... B01J 20/12
                                                              210/688

* cited by examiner

*Primary Examiner* — Edward Johnson
(74) *Attorney, Agent, or Firm* — Muncy, Geissler, Olds & Lowe, P.C.

(57) ABSTRACT

The present invention relates to a method for granulation of an absorbent and adsorbent granules prepared by the same. The method comprises the steps of blending sodium metasilicate, metakaoline and an inorganic ion exchange material in water to form a slurry; decanting the resulted slurry onto a nylon cloth of 300 to 400 meshes and natural drying at ambient temperature to solidification; then breaking the solidified final product and sieving it by a screen having a mesh size of from 0.2 to 2.5 mm to provide the absorbent granules having excellent absorbability.

12 Claims, 1 Drawing Sheet

METHOD FOR GRANULATION OF ADSORBENT AND ADSORBENT GRANULES PREPARED BY THE SAME

BACKGROUND OF THE INVENTION

1. Field of Invention

The present invention relates to a method for granulation of an adsorbent, and in particular, to a method for granulation of the adsorbent from sodium metasilicate, metakaolin and the inorganic ion exchange material to provide the adsorbent granules having excellent adsorbability and having an appropriate particle size. The present invention also relates to the adsorbent granules prepared by the method.

2. Related Art

With development of the nuclear industry, the radioactive wastewater is produced in great volume, causing serious damage to environment. For treatment of the radioactive wastewater, it primarily involves converting the high radioactive effluent by treatment to the moderate or low radioactive effluent, and solidifying it prior to low radioactive disposal, attempting to minimize the damage of the radioactive waste to environment as far as possible.

$^{90}$Sr and $^{137}$Cs are the fission products with high heat release and long lifetime in the high radioactivity effluent, with a high ratio in the radioactive components, therefore for conversion of the high radioactive effluent into the low radioactive one, removal of $^{90}$Sr and $^{137}$Cs is a critical step. The conventional treatment methods and technologies comprise: concentration by evaporation, biological treatment, chemical precipitation etc., however in view of complicated composition of the actual waste water and presence of some unsolvable disadvantages for these technologies in practice, the ion exchange process becomes an increasingly popular treatment technology.

Separation of $^{90}$Sr and $^{137}$Cs from the high radioactive effluent by the ion exchange process is an important approach in the art, wherein an organic resin is a material commonly used in the conventional ion exchange technology, however, the organic resin is poor in heat resistance and radiation resistance, has high potential energy required for metal ion exchange, has voids readily formed during solidification, causing the effluent to elute out, and has the decomposed products which are not in favor of subsequent processing, compromising the treatment effects, therefore its value in practice hangs in doubt, and the inorganic ion exchange technology is preferred. Compared to the organic adsorbing materials, the inorganic adsorbing materials are advantageous as follows: (1) acid resistance; (2) high radiation resistance, useful for adsorptive separation under strong radioactivity; (3) high temperature resistance during final disposal of the radioactive waste, having good compatibility with glass and cement; (4) high selectivity; (5) simple to operate; (6) inexpensive for the natural inorganic ion exchange materials, and easy for preparation of the artificial inorganic ion exchange materials. Therefore, the inorganic ion exchange process is an economical and appropriate processing mode for treatment of the radioactive waste.

The inorganic ion exchange materials which has been used presently include primarily: (1) natural/artificial zeolite; (2) composite ion exchange materials, such as titanium phosphate $Ti_3(PO_4)_4$ (TiP) complexed with ammonium phosphomolybdate $(NH_4)_3PMo_{12}O_{40}$ (AMP), zirconium phosphate $Zr_3(PO_4)_4$ (ZrP) complexed with ammonium phosphomolybdate (ZrP-AMP), and stannum phosphate $Sn_2P_2O_7$ (SnP) complexed with ammonium phosphomolybdate (SnP-AMP); (3) metallic ferrocyanide and ferricyanide; (4) heteropoly acid salts, ammonium phosphotungstate (APW), zirconium phosphotungstate (PWZr) and zirconium phosphomolybdate (PMoZr); (5) multivalent metallic phosphate; (6) multivalent metallic (transition metal) oxyhydroxides and hydrate.

The zeolite materials are a type of the firstly studied ion exchange materials. Its component is common aluminosilicate with strong radiation resistance and high temperature resistance, a three-dimensional crystalline essentially consisting of $SiO_4$ and $AlO_4$ tetrahedrons. Due to its high surface area, it has significant ion adsorption and exchange capacity, wherein its exchange capacity is significantly affected by acidity and salt content of the solution, with optimal working conditions of 3<pH<10.

The artificial zeolite enables removal of multiple radioactive ions, i.e., it enables not only removal of the mono- and divalent radioactive ions, but also effective removal of the radioactive rare earth ions, such as $Y^{3+}$. Clinoptilolite has high cation exchange capacity, which is significantly selective for $^{137}$Cs over the other alkali and alkaline earth group element cations. The $Na^+$ zeolite has a maximal distribution factor for $^{137}$Cs, and it is known from column test that the zeolite also has strong adsorption effect on $^{90}$Sr. Adsorption of $Sr^{2+}$ on the zeolite includes predominant chemical adsorption and minor physical adsorption, and under varied acidity and salt load of the solution, adsorption capacity is also affected; at gradually increased pH, equilibrium adsorption capacity of zeolite for $Sr^{2+}$ is also increased.

The modified natural zeolite and the artificial zeolite having high ion exchange capacity are of interest in study, wherein the zeolites of A type, synthesized from $NaAlO_2$, $Na_2O.SiO_2$ and NaOH, exhibit its adsorption effect in the test for adsorption of $Sr^{2+}$ and $Cs^+$, the clinoptilolite of NaA-X type has super adsorption effect on $Sr^{2+}$, and the synthetic zeolite of X type is significantly selective for monovalent and divalent ions.

AMP, ammonium dodecatungstophosphate (ATP), TiFCN, ZnFCN and CaFCN are the inorganic ion exchange materials having higher exchange capacity for $Cs^+$, useful in an acidic simulation solution. Of these, Cs+ clearance is up to 95% for AMP, but due to in the form of fine powder microcrystallite structure, AMP has poor hydraulic performance, causing spray washing and column test to be difficult, resulting in its application to be limited.

Most of the composite ion exchange materials are limited severely in application due to difficult molding or irregular granules produced, poor mechanical strength and fragility in practice; therefore, the disadvantages above must be overcome prior to use in practice.

The composite TiP-AMP, which has been modified to have the preferred properties of particles, has superior performance over the ion exchange material having TiP or AMP alone, which allows blocking in TiP as the ion exchange material occurred during removal of 137Cs from the high radioactive effluent to be improved, and also solves the problem in granulation of AMP, leading to improvement of ion exchange performance, as indicated in the literature (Yu, B., J. Chen, X. W. Zhu and C. L. Song, *Research progress of $^{137}$Cs removal from acidic high-level liquid waste*. Atomic Energy Science and Technology, 2002. 36(1): p. 51-57).

$[Fe(CN)_6]^{4-}$ has super high chemical stability, pore size, specific surface area, mechanical stability, radiation resistance, and less apparent density in favor of fluid transfer, and is an ion exchange material with high potential application. $[Fe(CN)_6]^{4-}$ has strong binding to $Cs^+$, and from the results in the literature, the strength preference for adsorption of the ions in the simulated high radioactive effluent onto the spherical $[Fe(CN)_6]^{4-}$ is $Cs^+>>Ni^+>Fe^{2+}>Sr^{2+}>Na^+>Cr^+>Nd^+$.

However, for $[Fe(CN)_6]^{4-}$ prepared by the general conventional methods, due to its irregular shape, too fine granule and poor mechanical strength, it is difficult to use in the column test.

Improvement of hydraulic performance of the granules was of much interest in recent years for the ferrocyanide ion exchange material, such as loading of cupric ferrocyanide onto polyurethane resin, or absorption of nickel potassium ferrocyanide onto zeolite, to prepare the composite ion exchange granules. In addition, preparation of the spherical composite ion exchange materials by sol-gel method has been also studied, including complexing the materials difficult to be molded by the conventional methods into or onto the gelled pellets. The granules prepared by this method are mostly in the form of ball with particle diameter being customized as demand, and has high mechanical strength, good flow property, uniformity, high porosity and specific surface area with high channel diameter, however the wet gelled pellets have shrunk significantly in volume during drying, and the gelled pellets of some composites are susceptible to fragile during drying.

Pyrophosphate as heteropoly acid salt is a type of high performance ion exchange materials, having exchange capacity for $Cs^+$ over the commonly used inorganic ion exchange materials under neutral conditions. Zirconium pyrophosphomolybdate is an amorphous inorganic ion exchange material with high thermal stability and acid resistance, which keeps high ion exchange capacity in the acid medium, and is suitable for ion exchange with $Cs^+$ under acidic condition. Pyrophosphate has a long chain in favor of improvement of material stability, and among various metallic ions, $Sr^{2+}$ has a maximal distribution factor for stannum pyrophosphate, therefore stannum pyrophosphate is selected as ion sieve matrix for extraction of $Sr^{2+}$. In the ion sieve for extraction of strontium, the voids for ion exchange have a size very close to $Sr^{2+}$ ionic radius, causing chemical bond and sieving effect and improving the separation coefficient, and moreover, after physical process (such as granulation process) and chemical modification, it provides the sieving effect with significant selectivity, therefore the ion sieve for extraction of strontium would be expected to be a novel material for separation of radionuclide from the high radioactive effluent.

In the inorganic ion exchange materials, ZrP has strong affinity and high adsorbability for Cs, with exchange capacity of up to 4.3±0.1 meq $g^{-1}$ in the basic solution, and exhibits favorable physical stability in both the dynamic and static ion exchange tests, and also has effective ion exchange properties at 300° C.

From the literature, in the process flow of recovering $Cs^+$ from the acid waste water, both ZrP and TiP have favorable stability for radiation resistance, and the absorbed exchange materials are susceptible to regeneration by spray washing, and may be used for direct extraction of $^{137}Cs$ from the acidic, high radioactive effluent, and also may be used as the adsorbent for gamma radiator. However, the phosphate exchange materials have low exchange capacity in the high radioactive effluent with acidity and high salinity, and it is difficult to allow the water quality of drain liquid to meet the standard for discharge water. Moreover, the circulating water for the reactor is usually neutral and basic, and ZrP is susceptible to loss of phosphate radical by hydrolysis, lowering ion exchange performance.

Most of oxyhydroxide and hydroxide of multivalent metals (transition metals) have amphoteric exchange property. Adjustment of pH of the alumina hydrate solution enables separation of the carrier-free radionuclides such as Fe, Mo, Tc and I. The quadrivalent metal oxides, such as $SnO_2$, $TiO_2$, $ThO_2$ and $ZrO_2$, also have the amphoteric exchange performance, and its specific boundary depends on alkalinity of center metal atom and intensity contrast of metal-hydrogen bond and hydrogen bond-hydrogen bond. $MnO2$ has significant adsorbability for fission product in the effluent; and for treatment of 89Sr-containing effluent by manganese oxide hydrate, its clearance may be up to 95%.

Oxyhydroxide and hydroxide of aluminum and ferrum also have significant absorptive effect on $Sr^{2+}$, and in case of presence in the alkaline solution, have high adsorption effect on $Sr^{2+}$, as a result of dissociation of $H^+$ from carbonyl. Thermal treatment of oxide and hydroxide allows surface area to be substantially increased, leading to increased adsorption efficiency on $Sr^{2+}$. However, the thermal treatment is controlled to be at 500° C. for 3 hours or more, without economical efficiency.

Furthermore, the surface area on the inorganic adsorbent is related with the capacity for adsorption of radioactive elements, but the flow rate of fluid must also be considered for ion exchange on column. In case of increased surface area of the adsorbent and reduced particle size of the adsorbent, it is easy to block the column due to relative reduction of channel space for fluid flow by dense packing in the column, potentially causing pressure loss in the adsorbing column to be too high. If the particle size of the adsorbent is increased so that the column is unblocked upon packing and has sufficient space in channel for fluid flow, the surface area of the adsorbent would be reduced, compromising the adsorbability.

To this end, how to provide the adsorbent granules with suitable particle size for packing but unblocking the column while keeping high absorption surface area to have adsorptive capacity, in a simple manner, is a challenge to be solved by the inventors. Therefore, in the extensive studies by the inventors for the methods for preparation and granulation of the inorganic adsorbent, it has been found that the adsorbent granules having suitable particle size and high surface area may be prepared by granulation of zeolite as the inorganic ion exchange adsorbent with sodium metasilicate and metakaolin, without heating, thereby implementing the present invention.

SUMMARY OF THE INVENTION

Provided is a method for granulation of adsorbent, comprising the steps of: (1) formation of slurry: blending sodium metasilicate, metakaolin and the inorganic ion exchange material into water to form the slurry; (2) drying: pouring the resulted slurry onto a nylon cloth with 300-400 meshes, and natural drying at an ambient temperature ranging from 20-35° C. to solidification; and (3) granulation: breaking the solidified final product and sieving on the sieve with mesh size of 0.2-2.5 mm by vibration, to provide the adsorbent granules with particle size of 0.2-2.5 mm.

In the method for granulation of the adsorbent according to the present invention, for the step of formation of the slurry (1), a sequence for addition of sodium metasilicate, metakaolin and the inorganic ion exchange materials is not specially limited, so long as sodium metasilicate is firstly dissolved into water, prior to sequential addition of metakaolin and the inorganic ion exchange material, or sequential addition of the inorganic ion exchange material and kaolin. The amounts of sodium metasilicate, metakaolin and water used are by molar ratio and are subject to the following conditions:

Si/Al=1.5~1.8
Na/Si=0.85~1
$Na_2O/SiO_2$=0.43~0.5
$H_2O/Na_2O$=11.0~15.0.

In the method for granulation of the adsorbent according to the present invention, for the step of formation of the slurry (1), the inorganic ion exchange material is added at an amount of 1.5-2.5 times higher than metakaolin by weight.

In the method for granulation of the adsorbent according to the present invention, the inorganic ion exchange material used is not specially limited, so long as its own properties would not alter at basic environment, and is exemplified by: (1) natural/artificial zeolite; (2) composite ion exchange materials, such as titanium phosphate $Ti_3(PO_4)_4$ (TiP) complexed with ammonium phosphomolybdate $(NH_4)_3PMo_{12}O_{40}$ (AMP), zirconium phosphate $Zr_3(PO_4)_4$ (ZrP) complexed with ammonium phosphomolybdate (ZrP-AMP), and stannum phosphate $Sn_2P_2O7$ (SnP) complexed with ammonium phosphomolybdate (SnP-AMP); (3) metallic ferrocyanide and ferricyanide; (4) heteropoly acid salts, ammonium phosphotungstate (APW), zirconium phosphotungstate (PWZr) and zirconium phosphomolybdate (PMoZr); (5) multivalent metallic phosphate; (6) multivalent metallic (transition metal) oxyhydroxide and hydrate. These inorganic ion exchange materials may be used alone or in a combination of two or more.

In the present invention, without any limitation, the zeolite above is exemplified as native zeolite, diagenesis zeolite and hydrothermal zeolite, including all of natural zeolite or artificial zeolite, and is also exemplified as e.g. natrolite, mordenite, clinoptilolite, phillipsite, analcime, chabazite, scolecite, heulandite, stilbite, zeolite A, zeolite P, zeolite X, zeolite Y, H-ZSM-5 etc.

In the method for granulation of the adsorbent according to the present invention, for the step of formation of the slurry (1), in addition to sodium metasilicate, metakaolin and the inorganic ion exchange, optionally the metal foaming agent such as zinc metal powder, aluminum metal powder is added, which will react under basic condition in the granulation method according to the present invention to generate gas, which enables formation of a volume of closed pore structure within the granulated granules, leading to increase in its porous portion. For addition of the metal foaming agent, it is used at an amount of 0.1-5 w.t.% based on total of weight of metakaolin and the inorganic ion exchange material.

In the method for granulation of the adsorbent according to the present invention, for the drying step (2), the nylon cloth used with 300-400 meshes enables adsorption of alkali liquor from the slurry, and the drying time at ambient temperature ranging from 20-35° C. will depend on room temperature at that time; in case of low room temperature, the drying time would be prolonged, while in case of high room temperature, drying would be done for short time, substantially within 18-30 hours, to complete solidification. The called solidification means that the drying molded materials solidify as cement as felt by fingers and fix in shape to the extent of no deformation caused by moving or forcing, and are adapted by knocking or grinding to prepare the fragments having controllable particle size, without complete disintegration and comminution. In case of representation by numerical value, the called solidification means it solidifies to the extent of at least 5H or more, preferably at least 6H or more, for its surface hardness in the pencil hardness test (wolff-wilborn hardness pencil test, ASTM 3363).

In the method for granulation of the adsorbent according to the present invention, after the granulation step (3), it is rinsed with the Ca and Mg free water, to remove the residual base from the adsorbent. The Ca and Mg free water refers to water resulted from removal of Ca and Mg from hard water by treatment, i.e., soft water, and the deionized water may be also used, but for cost, soft water is preferred.

In the method for granulation of the adsorbent according to the present invention, in case of zeolite as the inorganic ion exchange material, it may also be prepared by the conventional method for preparation of zeolite, for example, sodium orthosilicate ($Na_4SiO_4$) is added to water at 40-60° C. for complete dissolution, and sodium metalluminate ($Na_2Al_2O_4$) is slowly added at the conditions subject to the following molar ratio, for hydrothermal chemical reaction at a temperature ranging from 40-60° C.:

Si/Al=0.25~0.5
Na/Si=6.0~8.0
$Na_2O/SiO_2$=3.0~4.0
$H_2O/Na_2O$=24.5~36.7

Then the hydrothermal reaction product is introduced into a plate and frame filter press, which has water passed through to wash the un-reacted agent off while filtering. The press cake is unloaded from the plate and frame filter press, and is placed into an air conducting oven at 80-110° C. for drying, comminuted into the powder, to provide the powdered zeolite. Herein, the zeolite preparation method is exemplified only, and is not limited to the methods above.

In the method for granulation of the adsorbent according to the present invention, due to granulation at ambient temperature without high temperature calcination to provide the adsorbent with sufficient hardness, the inorganic ion exchange material is avoided from disassociation at burning. Moreover, the process is simple without special equipment, to prepare the adsorbent granules with suitable particle size and excellent adsorptive capacity.

Another object of the present invention is to provide an adsorbent, prepared by the method for granulation of the adsorbent according to the present invention.

The adsorbent according to the present invention has an optimal particle size of 0.5-2.5 mm, suitable for packing the column and allowing pressure drop to reduce, and has excellent mechanical strength, good hydraulic performance and high adsorptive capacity.

The called good hydraulic performance in the present invention refers to no such phenomena as dissolution, absorption expansion and disintegration, as judged by appearance, after immersion of the adsorbent granules into the tap water for up to 3 months. The called high adsorptive capacity result refers to one which is at least 40% higher than that of the commercial adsorbent DT-32C purchased from Diversified Technologies Services Inc. as standard.

The adsorbent according to the present invention may bring the adsorption effect and pressure loss in system into equilibrium in case of use in column for ion exchange, may be used for absorption of the radioactive elements, particularly for $^{90}Sr$ and $^{137}Cs$, in the high radioactive waste water, and may be used for treatment of the high radioactive waste water.

DETAILED DESCRIPTION OF THE INVENTION

Figure 1:
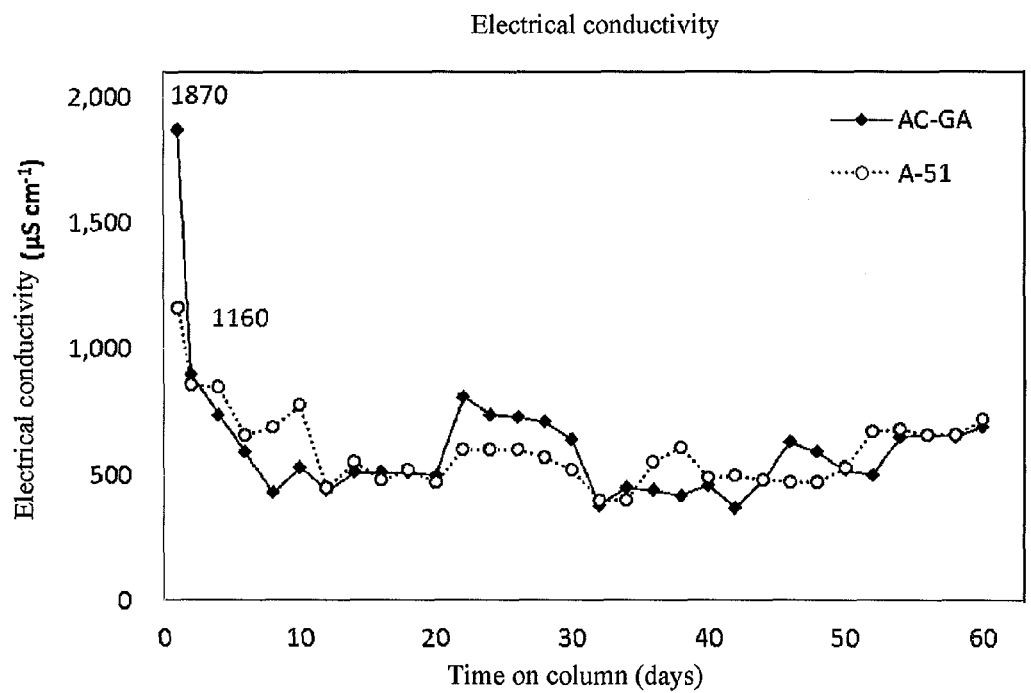
FIG. 1 show a graph of water electrical conductivity as a function of time as monitored in treatment of waste water by the granular adsorbent in Example of testing 2.

The method for granulation of the adsorbent according to the present invention comprises the steps of: (1) formation of the slurry: blending sodium metasilicate, metakaolin and the inorganic ion exchange material into water to form the slurry;

(2) drying: pouring the resulted slurry onto the nylon cloth with 300-400 meshes, and natural drying at an ambient temperature ranging from 20-35° C. to solidification; and (3) granulation: breaking the solidified final product and sieving on the sieve with mesh size of 0.2-2.5 mm by vibration, to provide the adsorbent granules with particle size of 0.2-2.5 mm.

In the present invention, the called "powder" refers to a particulate of less than 100 mesh (less than 150 μm), and the called "granule" refers to one with particle size ranging from 0.2 to 2.5 mm and larger than the powder particle size.

The present invention will be described in detail in the embodiments, which are illustrative of the present invention only, instead of limitation on a scope of the present invention.

EMBODIMENT

Example of Preparation 1

Preparation of Zeolite 50 kg of sodium orthosilicate ($Na_4SiO_4$) was added into water at 50° C. for complete dissolution, was made up to the volume of 500 liters with water at same temperature and fed into a reactor. Then, the temperature in the reactor was increased to 60° C. and maintained at this temperature; 60 kg sodium metalluminate ($Na_2Al_2O_4$) was added at a slow rate of about 2 kg min−1, and stirred uniformly at this temperature of 60° C. for 18 hours for hydrothermal chemical reaction (wherein by molar ratio, Si/Al=0.37, Na/Si=6.7, $Na_2O$/$SiO_2$=3.4, $H_2O$/$Na_2O$=30.6). Then, the contents in the reactor were introduced with a purified water into the plate and frame filter press, while water was passed through to wash the un-reacted residual agents off, thus completing filtration of the powder. The press cake on the plate and frame filter press was placed into the air conduction oven set at a temperature of 100° C. for drying, and then the dried cake was broken, to give about 45 kg of zeolite, called zeolite A hereinafter.

Embodiment 1

Granulation of the Adsorbent 17.5 kg of sodium metasilicate powder was added into 35 liters of water for complete dissolution, to give a solution of sodium metasilicate in water. 20 kg of metakaolin was placed into a mechanical mixer, and 35 liters of the resulted sodium metasilicate aqueous solution was added with stirring at a rotational speed of 100 rpm for 15 minutes, to give the slurry (wherein Si/Al=1.7, Na/Si=0.93, $Na_2O$/$SiO_2$=0.47, $H_2O$/$Na_2O$=13.6). Then, to the slurry, 40 kg of zeolite A from Example of preparation 1 was added with uniform stirring for 15 minutes.

Then, the resulted slurry was poured onto the nylon cloth of 400 meshes, and dried at room temperature for about 24 hours until solidifying. Then, the molded final product was broken and sieved on the sieve with mesh size of 2 mm by vibration, to give the adsorbent granules with particle size of less than 2 mm.

Then, 1.0 g of $Ca(OH)_2$ and 0.5 g of $Na_2CO_3$ were added into 1 liter of tap water, and had $CO_2$ passed through to consume the residual $Ca(OH)_2$. After resting for precipitation of $CaCO_3$ and $Mg(OH)_2$, the Ca and Mg free water was obtained. The resulted adsorbent was washed with the resulted water, and dried at a temperature of 40° C., to give the granule adsorbent 1.

Embodiment 2

Granulation was carried out as in Embodiment 1, except for zeolite X in place of zeolite A in Embodiment 1, to give the granule adsorbent 2.

Embodiment 3

Granulation was carried out as in Embodiment 1, except for zeolite X in place of zeolite P in Embodiment 1, to give the granule adsorbent 3.

Embodiment 4

Granulation was carried out as in Embodiment 1, except for zeolite X in place of zeolite A in Embodiment 1 and addition of 2 kg of the activated carbon, to give the granule adsorbent 4.

Embodiment 5

Granulation was carried out as in Embodiment 1, except for zeolite X in place of zeolite A in Embodiment 1 and addition of 2 kg of Al2O3, to give the granule adsorbent 5.

Embodiment 6

Granulation was carried out as in Embodiment 1, except for zeolite X in place of zeolite A in Embodiment 1 and addition of 2 kg of Ti2O3, to give the granule adsorbent 6.

Embodiment 7

Granulation was carried out as in Embodiment 1, except for zeolite X in place of zeolite A in Embodiment 1 and addition of 2 kg of natural chabazite, to give the granule adsorbent 7.

Embodiment 8

Granulation was carried out as in Embodiment 1, except for zeolite X in place of zeolite A in Embodiment 1 and addition of 2 kg of natural clinoptilolite, to give the granule adsorbent 8.

Embodiment 9

Granulation was carried out as in Embodiment 1, except for zeolite X in place of zeolite A in Embodiment 1 and addition of 2 kg of vermiculite, to give the granule adsorbent 9.

Embodiment 10

Granulation was carried out as in Embodiment 1, except for ZrHP (a product from coprecipitation of zirconium oxychloride and phosphoric acid under controlled conditions) in place of zeolite A in Embodiment 1, to give the granule adsorbent 10.

Embodiment 11

Granulation was carried out as in Embodiment 1, except for addition of 0.6 kg of the modifying agent zinc metal powder as the metal foaming agent, to give the granule adsorbent 11.

Example of Testing 1

Testing for Adsorption Efficiency of Adsorbent

The column with diameter of 2 cm and length of 20 cm was packed with 0.2 g of the adsorbent, and 2000 ppm $^{90}$Sr and/or $^{89}$Sr (i.e., [Sr] $C_0$=2000 ppm (mg L$^{-1}$)) in 30 ml (V) water was passed through it at time space velocity of 5 h$^{-1}$ (retention time of 12 minutes). After batch adsorption for 18 hours, the concentration ($C_i$) of Sr in the solution was analyzed, with the adsorptive capacity Calculated by the following equation:

Calculation of difference between concentrations [Sr] before and after adsorption $$\Delta C = C_0 - C_i (\text{mg L}^{-1})$$

followed by conversion into the removed [Sr] by the following equation:

$$M(\text{mg}) = \Delta C \times V$$

followed by conversion into the adsorption equivalent amount per weight of the adsorbent ([Sr]=87.6, divalent)

$$\text{meq} = M/(87.6/2)/W(\text{meq g}^{-1})$$

Adsorption efficiency R % was calculated by the following equation:

$$R\% = (C_0 - C_i)/C_0 \times 100\%$$

The adsorbent used in the example of testing was the non-granulated zeolite A prepared in Example of preparation 1 (Reference 1), the adsorbent 1 from Embodiment 1, zeolite A-51 (Comparative Example 1) from UOP IONSIV Corp. and the ion exchange agent DT-32C (Comparative Example 2) from Diversified Technologies Services Inc. (http://buyersguide.power-eng.com/Search/10832/diversified-technologies-services-inc.html). Its testing results were given in table 1 below.

TABLE 1 the results from comparison between the Reference, Embodiment and Comparative Example

| | Adsorbent | Equivalent adsorption (meq g$^{-1}$) | Adsorption efficiency R(%) | *Adsorptive capacity |
|---|---|---|---|---|
| Reference 1[a] | Zeolite A | 4.5 | 60.2 | 1.73 |
| Embodiment 1[b] | Adsorbent 1 | 4.3 | 57.7 | 1.65 |
| Comparative Example 1[c] | A-51 | 3.3 | 49.9 | 1.27 |
| Comparative Example 2[c] | DT-32C | 2.6 | 38.2 | 1.00 |

*Adsorptive capacity refers to the adsorption rate for 1 hour with the commercial adsorbent DT-32C as standard.
[a] powdered adsorbent
[b] granular adsorbent
[c] commercial adsorbent From the table 1, the granular zeolite in Embodiment 1, obtained by granulation of the powdered zeolite prepared in Example of preparation 1 by the granulation method according to the present invention, has less significantly reduced performance, and its performance is preferred over the commercial products, regardless of granulation. It is obvious that granulation of the adsorbent with high particle size by the granulation method according to the present invention will not compromise its adsorbability, and therefore, the granular adsorbent, prepared by the granulation method according to the present invention, favors equilibrium between adsorption effect and pressure loss in system during ion exchanging on column.

Example of Testing 2

Testing for Performance of the Granular Adsorbent

Performance of the granular adsorbent for treatment of waste water was determined by column flushing test. Test conditions on column were as follows:

Column radius: 2 cm
Adsorbent packing height: 20 cm
Adsorbent: (1) zeolite A-51, available from UOP IONSIV Corp.
(2) the adsorbent 1 prepared in Embodiment 1
Retention time of waste water in column (adsorbent packing volume/liquid flow, V/Q): 12 minutes (Space flow rate: 5 h$^{-1}$)
Sampling frequency: once per 2 days
Waste water source: waste water produced in the procedure for rinsing of all of the articles or persons in the control area of the Institute of Nuclear Energy Research
Testing procedure:
1. Packing the adsorbent into the column.
2. Continuously introducing the waste water to be treated into the column at the lower part, allowing water flow through the adsorbent to upper part of the column.
3. Allowing the adsorbent-treated water to exit out of the column at top overflow port, and collecting for water quality analysis, such as electrical conductivity and radioactivity.

Electrical conductivity represents the effects of adsorbent used on the treated drainage water quality. If the adsorbent has ions eluted out due to residues from preparation process or its own structure disintegration, the electrical conductivity of the treated water would rise. The treated waste water has the initial electrical conductivity of 1870 µS cm$^{-1}$, which outranges the water quality standard for drainage and is required to be treated; upon treatment above, water has the average electrical conductivity of lower than 750 µS cm$^{-1}$, after use of zeolite A-51 and the adsorbent 1 of the present invention for long period of 30 days. Water electrical conductivity as monitored during treatment of waste water by the granular adsorbent as a function of time was illustrated in FIG. 1. From FIG. 1, the adsorbent according to the present invention is the same in handling as the currently and extensively used zeolite A-51, and do not allows additional ions added in the treated water (electrical conductivity is 430 µS cm$^{-1}$ for original water; and is 750 µS cm$^{-1}$ in the laws and regulations for drainage water), and it is obvious for structural and material stability of the adsorbent prepared by the method of the present invention, in water.

Figure 2:
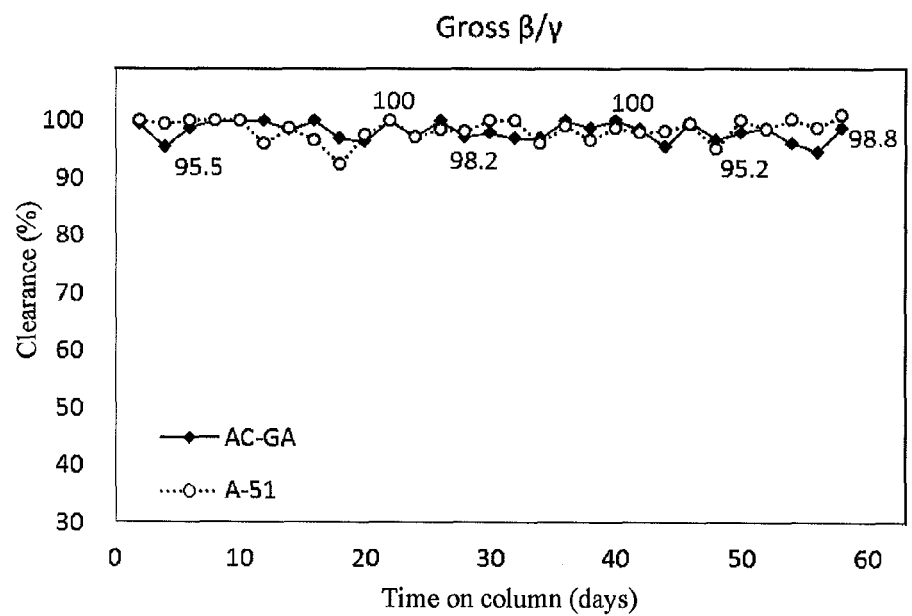
FIG. 2 show a graph of clearance of radioactivity from water as a function of time as monitored in treatment of waste water by the granular adsorbent in Example of testing 2.

Radioactivity represents the treatment performance for adsorption of the radioactive elements by the adsorbent. In example of testing, the waste water to be treated had an initial radioactivity of 1.7 Bq mL$^{-1}$, and the radioactivity of 0.0186 Bq mL$^{-1}$ in the laws and regulations for drainage water. Clearance of water radioactivity as monitored during treatment of waste water by the granular adsorbent as a function of time was illustrated in FIG. 2. From FIG. 2, after the waste water was treated as above, use of the zeolite A-51 and the adsorbent 1 of the present invention over the long period of 60 days enables radioactivity to drop to be lower than 0.0186 Bq mL$^{-1}$ provided in the laws and regulations for drainage water, and clearance of its radioactive elements may be kept at 95% or more. It is obvious that the adsorbent prepared by the granulation method according to the present invention has the same or higher clearance of the radioactive elements, as the existing, commercial available adsorbent.

What is claimed is:

1. A method for granulation of an adsorbent, comprising:
   (1) formation of a slurry: blending sodium metasilicate, metakaolin and an inorganic ion exchange material into water, to form the slurry;
   (2) drying: pouring the resulted slurry containing the inorganic ion exchange material onto a nylon cloth of 300-400 meshes, and natural drying at ambient temperature ranging from 20-35° C. to solidification; and
   (3) granulation: breaking the solidified final product and sieving on a sieve with mesh size of 0.2-2.5 mm by vibration, to provide the adsorbent granules with particle size of 0.2-2.5 mm.

2. The method for granulation of the adsorbent according to claim 1, wherein in Step (1) for formation of the slurry, sodium metasilicate is firstly dissolved into water, and then metakaolin and zeolite are added sequentially.

3. The method for granulation of the adsorbent according to claim 1, wherein in Step (1) for formation of the slurry, sodium metasilicate is firstly dissolved into water, and then zeolite and metakaolin are added sequentially.

4. The method for granulation of the adsorbent according to claim 1, wherein in Step (1) for formation of the slurry, the amounts of sodium metasilicate, metakaolin and water used are by molar ratio and are subject to the following conditions:
   $Si/Al=1.5\sim1.8$
   $Na/Si=0.85\sim1$
   $Na_2O/SiO_2=0.43\sim0.5$
   $H_2O/Na_2O=11.0\sim15.0$.

5. The method for granulation of the adsorbent according to claim 1, wherein in Step (1) of formation of the slurry, the inorganic ion exchange material is added at an amount of 1.5-2.5 times higher than metakaolin by weight.

6. The method for granulation of the adsorbent according to claim 1, after Step (3) for granulation, it is rinsed with the Ca and Mg free water, to remove the residual base from the adsorbent.

7. The method for granulation of the adsorbent according to claim 1, wherein in Step (1) for formation of the slurry, the inorganic ion exchange material is selected from at least one of a group consisting of: natural/artificial zeolite, the composite ion exchange material, metallic ferrocyanide and ferricyanide, heteropoly acid salts, multivalent metallic phosphate, and multivalent metallic oxyhydroxide and hydroxide.

8. The method for granulation of the adsorbent according to claim 7, wherein the inorganic ion exchange material is zeolite selected from at least one of natrolite, mordenite, clinoptilolite, phillipsite, analcime, chabazite, scolecite, heulandite, stilbite, zeolite A, zeolite X, zeolite P, zeolite Y, and H-ZSM-5.

9. The method for granulation of the adsorbent according to claim 8, wherein the zeolite used in Step (1) for formation of the slurry is the artificial zeolite prepared as follows:
   sodium orthosilicate ($Na_4SiO_4$) is added to water at 40-60° C. for complete dissolution, and sodium metalluminate ($Na_2Al_2O_4$) is slowly added at the conditions subject to the following molar ratio, for hydrothermal chemical reaction at a temperature ranging from 40-60° C.:
   $Si/Al=0.25\sim0.5$
   $Na/Si=6.0\sim8.0$
   $Na_2O/SiO_2=3\ 0.0\sim4.0$
   $H_2O/Na_2O=24.5\sim36.7$
   then the hydrothermal reaction product is introduced into a plate and frame filter press prior to passage with water for washing the un-reacted agent off while filtering; the press cake is unloaded from the plate and frame filter press, and is placed into an air conducting oven set at a temperature of 80-110° C. for drying, and is comminuted into the powder, to provide the powdered zeolite.

10. An adsorbent, prepared by the method for granulation of the adsorbent according to any one of claim 1.

11. The adsorbent according to claim 10, used for absorption of a radioactive element in a high radioactivity waste water.

12. The adsorbent according to claim 10, wherein the radioactive element is at least one of $^{90}Sr$ and $^{137}Cs$.

* * * * *